US012657873B2

(12) United States Patent     (10) Patent No.:   US 12,657,873 B2

Palavalli et al.        (45) Date of Patent:     Jun. 16, 2026

(54) METHODS FOR RECOGNITION OF ELEMENTS AND ELEMENT RECOGNITION DEVICE

(71) Applicant: Continental Autonomous Mobility Germany GmbH, Ingolstadt (DE)

(72) Inventors: Harinath Palavalli, Bangalore (IN); Ashish Dhiman, Bangalore (IN); Suma Sulibhavi, Bagalkot (IN); Vishant Garg, Kurukshetra (IN)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 257 days.

(21) Appl. No.: 18/333,969

(22) Filed: Jun. 13, 2023

(65) Prior Publication Data

US 2023/0410473 A1     Dec. 21, 2023

(30) Foreign Application Priority Data

Jun. 14, 2022    (GB) ..................................... 2208663

(51) Int. Cl.
    *G06V 10/764*       (2022.01)
    *G06V 10/26*       (2022.01)
          (Continued)

(52) U.S. Cl.
    CPC ............ *G06V 10/764* (2022.01); *G06V 10/26* (2022.01); *G06V 10/82* (2022.01); *G06V 20/49* (2022.01)

(58) Field of Classification Search
    CPC ...... G06V 10/764; G06V 20/49; G06V 10/82; G06V 10/26
    See application file for complete search history.

(56) References Cited

U.S. PATENT DOCUMENTS

| | | | |
|---|---|---|---|
| 2010/0027845 A1* | 2/2010 | Kim | ........................ G06V 40/28 |
| | | | 382/107 |
| 2013/0108160 A1 | 5/2013 | Yamazoe | |
| 2014/0111647 A1 | 4/2014 | Atsmon | |

FOREIGN PATENT DOCUMENTS

WO       2017201323 A1    11/2017

OTHER PUBLICATIONS

Great Britain Intellectual Property Office Search Report dated Dec. 9, 2022 for the counterpart British Patent Application No. GB2208663.1.

(Continued)

*Primary Examiner* — David F Dunphy

(74) *Attorney, Agent, or Firm* — Fitch, Even, Tabin & Flannery LLP

(57) ABSTRACT

A computer-implemented method for recognition of elements may include receiving input data that includes an observation of an object. The object may include a plurality of elements. The method may further include classifying each element of the plurality of elements more than once based on the observation of the object, resulting in a plurality of classifications for each element. The method may further include accumulating the plurality of classifications for each element, resulting in accumulated classifications for each element. The method may further include recognizing each element based on the respective accumulated classifications, resulting in a plurality of element recognitions. The method may further include recognizing the object based on the plurality of element recognitions.

11 Claims, 6 Drawing Sheets

(51) Int. Cl.
    *G06V 10/82*     (2022.01)
    *G06V 20/40*     (2022.01)

(56)            References Cited

OTHER PUBLICATIONS

Jack Greenhalgh et al, "Recognizing Text-Based Traffic Signs", IEEE Transactions on Intelligent Transportation Systems, Jun. 2015.

Christoph Gustav Keller et al, "Real-time Recognition of U.S. Speed Signs", 2008 IEEE Intelligent Vehicles Symposium, Jun. 4-6, 2008, Doi: 10.1109/IVS.2008.4621282.

Andreas Magelmose et al, "Vision-Based Traffic Sign Detection and Analysis for Intelligent Driver Assistance Systems: Perspectives and Survey", IEEE Transactions on Intelligent Transportation Systems, vol. 13, Issue: 4, Dec. 2012, pp. 1484-1497.

Great Britain Intellectual Property Office Search Report dated Dec. 12, 2022 for the counterpart British Patent Application No. GB2208663. 1.

Christoph Gustav Keller et al, "Real-time Recognition of U.S. Speed Signs", 2008 IEEE Intelligent Vehicles Symposium, Jun. 4-6, 2008, pp. 518-523, DOI: 10.1109/IVS.2008.4621282.

Canadian Intellectual Property Office; Office Action dated Oct. 9, 2025; from related Canadian Patent Application No. 3,202,641, 4 pages.

\* cited by examiner

600

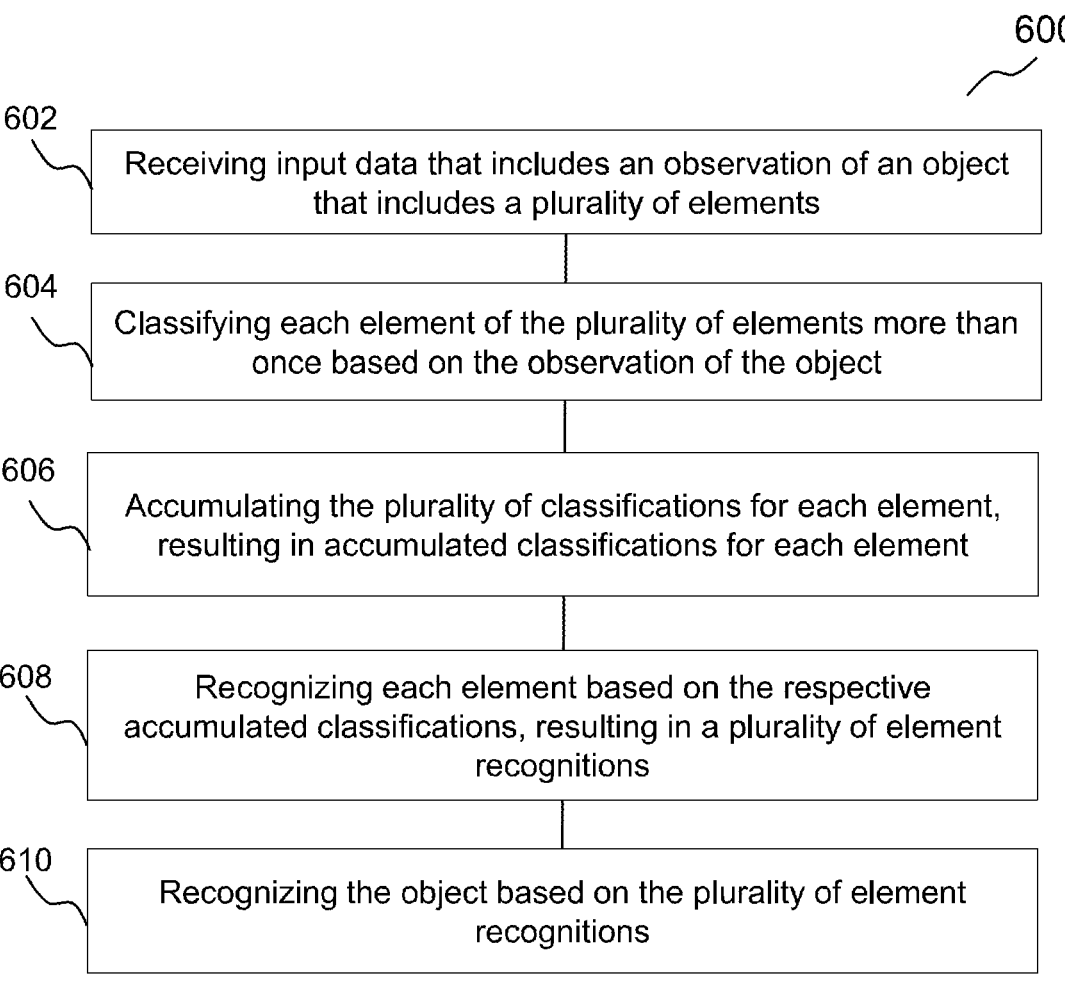

602

Receiving input data that includes an observation of an object that includes a plurality of elements

604

Classifying each element of the plurality of elements more than once based on the observation of the object

606

Accumulating the plurality of classifications for each element, resulting in accumulated classifications for each element

608

Recognizing each element based on the respective accumulated classifications, resulting in a plurality of element recognitions

610

Recognizing the object based on the plurality of element recognitions

FIG. 6

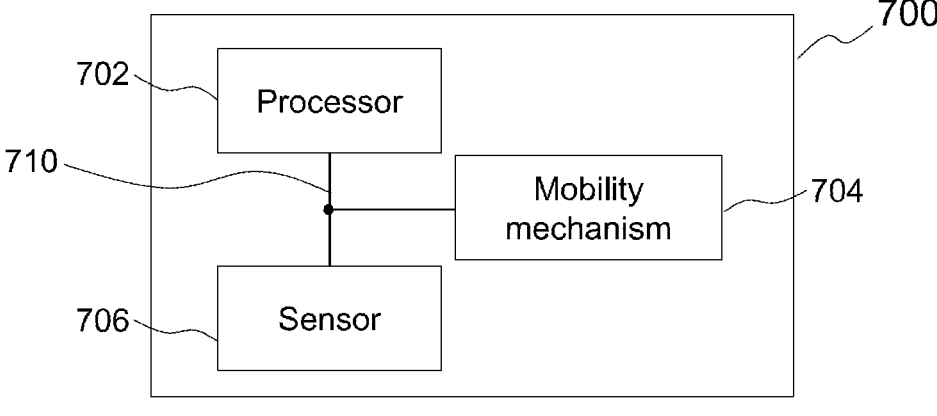

700

702  Processor

710

704  Mobility mechanism

706  Sensor

METHODS FOR RECOGNITION OF ELEMENTS AND ELEMENT RECOGNITION DEVICE

CROSS REFERENCE TO RELATED APPLICATION

The present application claims the benefit and priority of GB Patent Application No. 2208663.1, filed on Jun. 14, 2022, the content of which is incorporated by reference herein.

TECHNICAL FIELD

Various embodiments relate to methods of recognition of elements, and element recognition devices.

BACKGROUND

Existing methods of image recognition generally performs classification at an object-level. The accuracy in the classification depends on the quantity and quality of training data that is used to train the classifier. In other words, to perform the image recognition accurately, the classifier may need to be trained with a large amount of high quality training data. Further, the computing resources required for running the classifier may be large, as the classifier may look for features in the entire input image and may attempt to map these features to a classification type. Further, existing methods of classifying an entire object in an image may result in high error rates, for example, when there are multiple objects with similar appearance.

SUMMARY

According to various embodiments, there is provided a computer-implemented method for recognition of elements. The method may include receiving input data that includes an observation of an object. The object may include a plurality of elements. The method may further include classifying each element of the plurality of elements more than once based on the observation of the object, resulting in a plurality of classifications for each element. The method may further include accumulating the plurality of classifications for each element, resulting in accumulated classifications for each element. The method may further include recognizing each element based on the respective accumulated classifications, resulting in a plurality of element recognitions. The method may further include recognizing the object based on the plurality of element recognitions.

According to various embodiments, there is provided an element recognition device that includes a processor configured to perform the above-described method.

According to various embodiments, there is provided a non-transitory computer-readable medium comprising instructions which, when executed by a computer, cause the computer to carry out the above-described method.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the inven-

Figure 1:
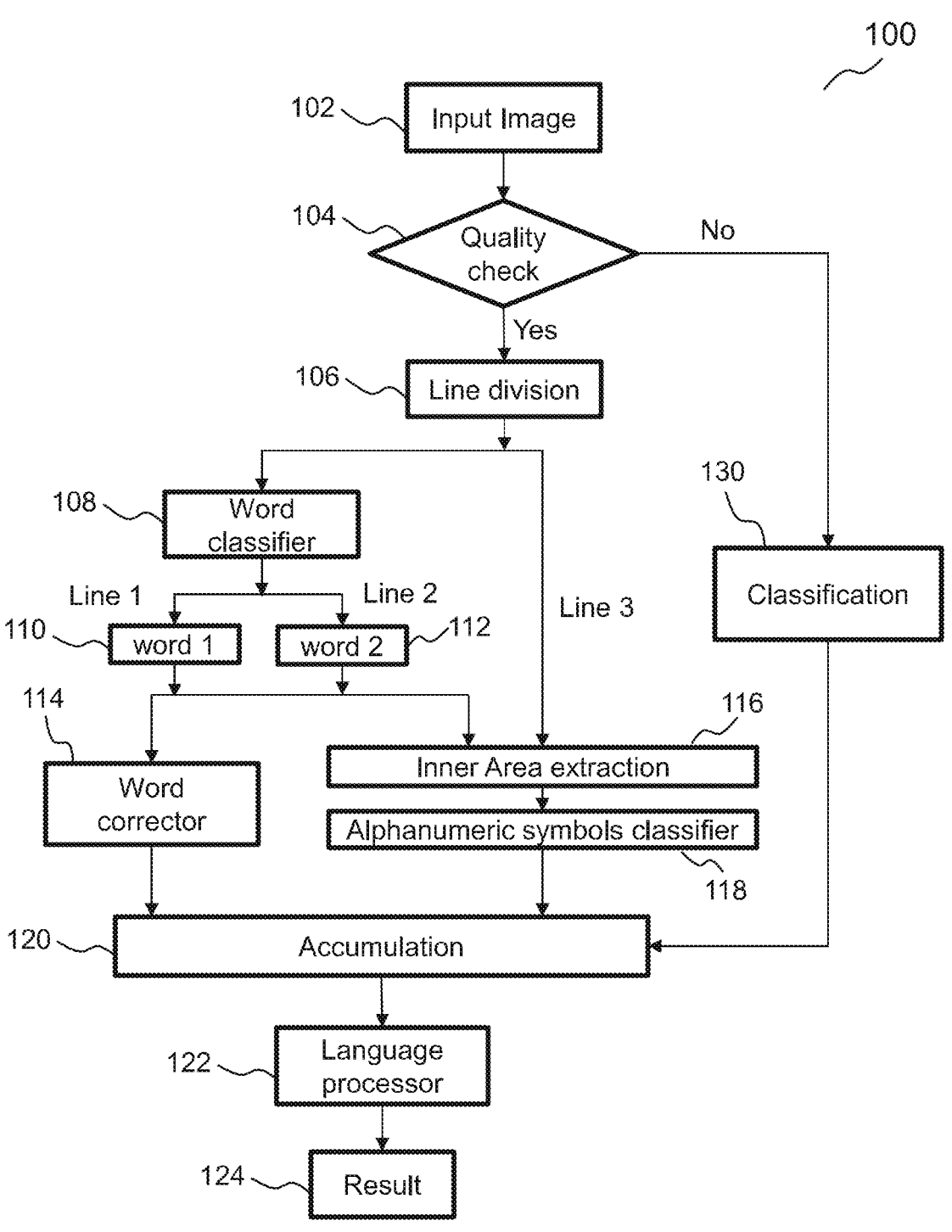

2 tion. In the following description, various embodiments are described with reference to the following drawings, in which:

FIG. 1 shows a flow chart of a computer-implemented method for recognition of elements, according to various embodiments.

Figure 2:
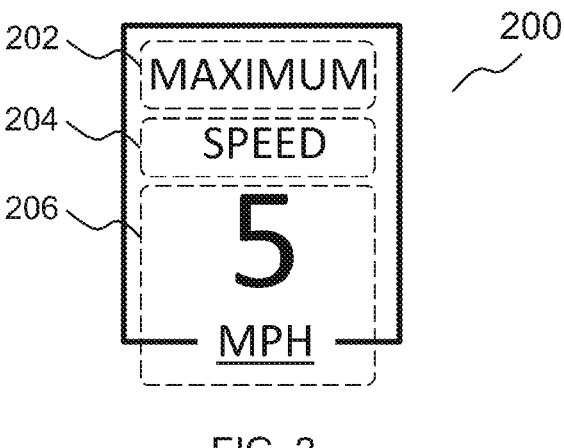

FIG. 2 shows an example of an input image.

Figure 3:
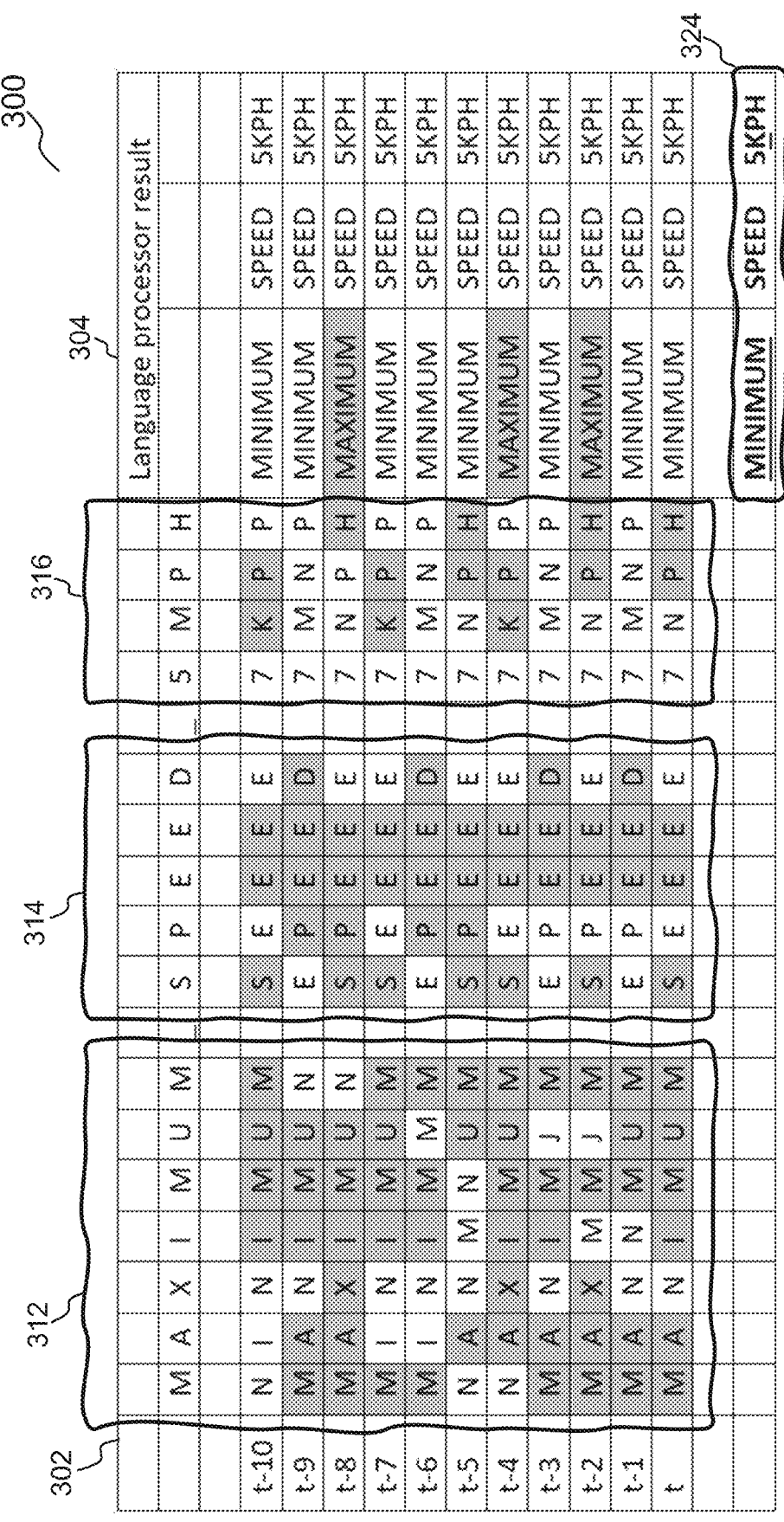

FIG. 3 shows a table that contains the intermediate and final results of a method for recognition of elements according to various embodiments, when applied on the input image of FIG. 2.

Figure 4:
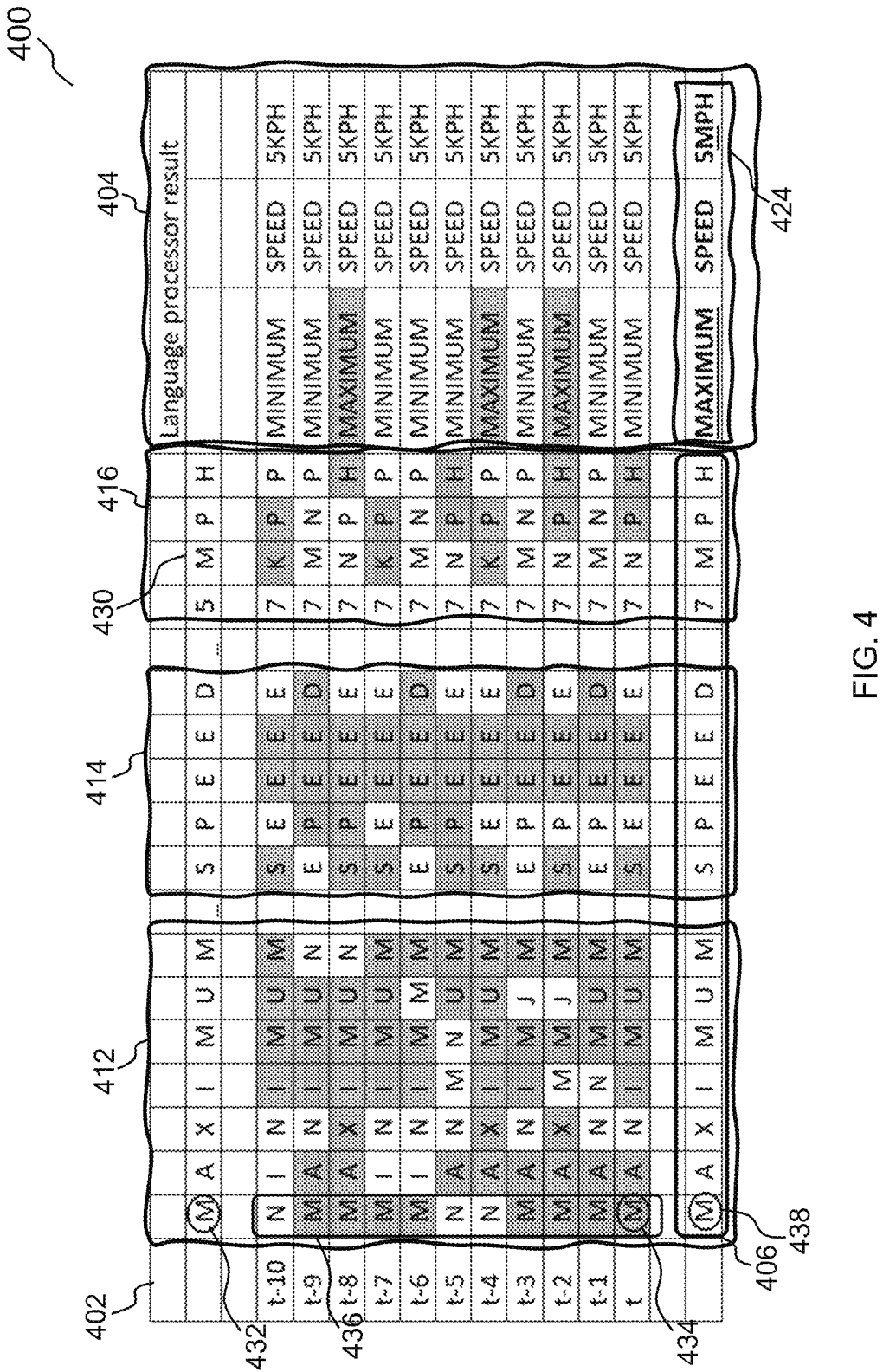

FIG. 4 shows a table that contains the intermediate and final results of the method 100 of FIG. 1, when applied on the input image of FIG. 2.

Figure 5:
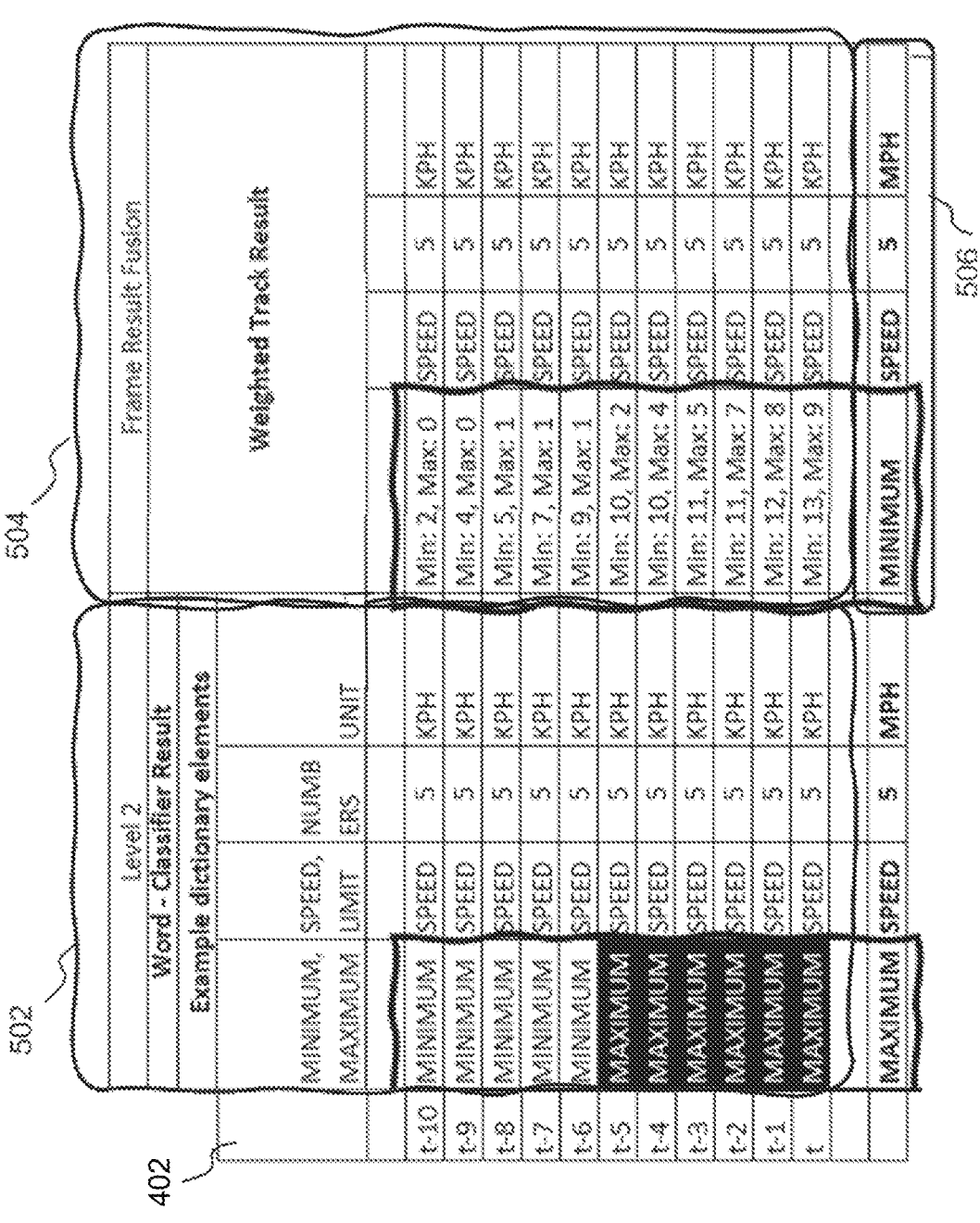

FIG. 5 shows an extension to the table, in relation to fusing the classification output of image-level classification, with the element-level classification results shown in FIG. 4.

FIG. 6 shows a flow diagram of a method for recognition of elements, according to various embodiments.

FIG. 7 shows a conceptual diagram of an element recognition device according to various embodiments.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In this context, the word "object" as described in this description may be understood as including a plurality of elements. An object may include a combination of elements.

In this context, "classifying" as described in this description may be understood as a computer-implemented process of assigning a dataset to a category. The dataset may include at least one element. In this context, the category may be interchangeably referred to as a "classification."

In this context, "recognizing" as described in this description may be understood as a computer-implemented process of identifying a dataset. The dataset may include at least one element.

In this context, the element recognition device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In order that the invention may be readily understood and put into practical effect, various embodiments will now be described by way of examples and not limitations, and with reference to the figures.

According to various embodiments, a method for recognition of elements may be provided. The method may be implemented using a computer. The method may also be referred herein as a method for recognition of information. The method may be used to recognize information from input data such as images, sounds, sensor measurements, etc. For example, the method may be used to recognize objects in images. The method may achieve a high level of accuracy, by performing classification at element-level more than once, and then accumulating the element-level classification results (also referred herein as intermediate results). The element-level classifications may be performed more than once by repeating the classification of each element for different values of a parameter. The parameter may be, for example, time, type of classifiers, method of data processing, spatial arrangement, etc. In other words, in an example where the parameter is time, each element may be classified at least once using observation of the object obtained at respective time instances, to generate multiple classifications of each element. In another example where the parameter is type of classifier, each element may be classified by a respective classifier of a plurality of classifiers, to generate a plurality of classification for each element.

The method may further include generating a recognition result of each element based on the accumulated element-level classification results, for example, based on weighted or unweighted maximum occurrences, or by taking the mean or the median of the accumulated element-level classification results. The method may include recognizing an object in the input data, based on the element-level classification results. Assuming the probability of error in the classification process is lower than 0.5, by accumulating the element-level classification results for different values of at least one parameter, the probability of error may be pushed towards zero as the number of accumulated element-level classification results increase. The accuracy may further improve as the element-level classification results are accumulated for two or more parameters.

In addition to performing classification at the element-level, the method may further include performing classification at the object level. The element-level and object-level classification results may be combined, to increase the overall recognition accuracy. The accumulation of classification results may also be carried out the word-level.

The method may further include comparing the accumulated intermediate results against predefined rules, i.e. heuristics, for example, predefined combinations of symbols, or checking the accumulated intermediate results against known rules of associations between the symbols. For example, if the recognized symbols form a word, the accumulated intermediate results may be compared to known words in a dictionary. For example, if the recognized symbols form a sentence, the accumulated intermediate results may be corrected based on known grammatical rules.

According to various embodiments, the method for recognition of elements may be used to recognize color-related visual information, such as traffic lights and taillights. For example, the input data may include photos taken by vehicle cameras. The method described may improve the recognition of these color-related visual information by accumulating color-based classification results over time and spatial positions.

According to various embodiments, the method for recognition of elements may be used to recognize road signs. For example, the input data may include photos taken by vehicle cameras. The method described may resolve ambiguity in the classification of road signs by accumulating confidence classification results over time and spatial positions.

According to various embodiments, the method for recognition of elements may be used to classify objects in images. For example, the input data may include photos taken by cameras, and the objects to be classified may include traffic participants such as vehicles, pedestrians and other roadside objects. The method described may improve the classification accuracy by accumulating the classification results over time and different classifiers.

According to various embodiments, the method for recognition of elements may be used for radar-based object classification. For example, the input data may include radar data. Radar sensors may detect clusters due to background environmental objects such as tunnels or bridges. These clusters may trigger false alarms when they are mistaken for detections of vehicles or traffic objects, or traffic congestion. The method described may resolve these confusions, by accumulating the classification results over at least one of time, different classifiers and spatial positions.

FIG. 1 shows a flow chart of a method 100 for recognition of elements, according to various embodiments. In this embodiment, the input data may include an image, and the elements in the image may include alphanumeric symbols. In 102, the method 100 may include receiving an input image. The input image may be captured by a camera. The input image may include, for example, an observation of a traffic sign like the input image 200 shown in FIG. 2. In other words, the input data captures an observation of an object, the object being the traffic sign. The traffic sign may include a plurality of elements, for example, alphanumeric symbols. In 104, the method 100 may include determining quality of the input image. Determining the quality of the input image may include checking whether the image is sufficiently large, i.e. meets a minimum quantity of pixels. Determining the quality of the input image may also include at least one of determining a distance at which the image was captured by a camera, blurriness of the input image, noise in the input image, strength of contrast in the input image, and detection of distortion or other artifacts in the input image.

If the quality of the input image is satisfactory, in 106, the input image may be segmented or divided into individual lines. Otherwise, the input image may be classified as if it is a single element. In 108, each line as segmented in 106 may be classified into words. In other words, in 108, a word classifier may be configured to classify the word contained in each line. For example, a first line of the input image may be classified by the word classifier as word 1, in 110. For example, a second line of the input image may be classified by the word classifier as word 2, in 112. Each of word 1 and word 2 may be fed to a word corrector, in 114. The word corrector 114 may be configured to check the words against a dictionary, or a database, and may be further configured to correct the words based on the dictionary or the database. The word corrector 114 may modify the recognized words to match existing words in the dictionary or the database. In parallel, the method 100 may further include 116, in which elements are extracted from the input image. The process 116 may include extracting elements from a different line from those processed by the word classifier in 108, or alternatively, may include extracting elements from the entire input image. In 118, the elements extracted from 116 may be classified as respective alphanumeric symbols. An alphanumeric classifier may be configured to classify each symbol as a respective alphanumeric symbol. In 120, the outputs of processes 114 and 118 may be accumulated, for example, track accumulated. Track accumulation may refer to accumulating the outputs in a spatial order. In other embodiments, the accumulation may be performed with respect to other parameters, for example, time, different classifiers, etc.

If in 104, the quality of the input image is assessed to be insufficient, the input image may be classified into a classification, in 130. This is because if the input image quality is not sufficiently high, it may not be feasible to extract or identify individual elements within the input image. The classifications generated in 130 may be fed to 120, for accumulation together with the outputs of processes 114 and 118.

In 122, the output of the accumulation process may be provided to a language processor. The language processor may be configured to check the validity of the accumulated outputs, for example, against a language dictionary, grammatical checks, or to check against a library that stores predefined strings of alphanumeric symbols. The language processor may be further configured to modify the accumulated outputs based on comparison with the predefined strings of symbols. In 124, the language processor may generate a result based on its modification of the accumulated outputs. In some embodiments, the method 100 may exclude 122, and instead, generate the accumulated outputs from 120 as the result.

FIG. 2 shows an example of an input image 200—an image of a traffic sign. The method 100 will be further described in the following paragraphs, and also with respect to FIGS. 3 and 4, using the traffic sign 200 as an example of the input image. In 106 of the method 100, the input image 200 may be segmented into a first line 202, a second line 204 and a third line 206. In this example, the first line 202 includes the word "MAXIMUM", the second line 204 includes the word "SPEED" and the third line 206 includes "5 MPH".

FIG. 3 shows a table 300 that contains the intermediate and final results of a method for recognition of elements according to various embodiments, when applied on the input image 200 of FIG. 2. In this example, the elements are alphanumeric characters. Column 302 of the table 300 indicates a time instance between, and including, t–10 to t. Each row shows the classification result of each word that includes a plurality of characters, at the respective time instance. In the table 300, block 312 shows the classification results of characters in the first line 202, block 314 shows the classification results of characters in the second line 204, and block 316 shows the classification results of characters in the third line 206. The highlighted cells with black background and white text indicate classification results with higher confidence. The block 304 shows the output of a language processor that checks the intermediate results of individual rows against predefined combinations of characters. For example, the intermediate result of t–10 is "NINIMUM SEEEE 7KPP". The language processor may compare "NINIMUM" to a database of predefined words, and correct it to "MINIMUM" which is the closest matching word in the database. The language processor may similarly correct "SEEEE" to "SPEED" and "KPP" to "KPH." Further, the database may store information on the available speed limit categories, and thus the language processor may determine that 7 KPH does not match any available speed limit category and thereby correct "7 KPH" to "SKPH". Block 324 shows the final result, which indicates "MINIMUM SPEED SKPH". The final result may be selected from the block 304, based on the maximum occurrence of classification result for each line. For example, the first line may be recognized as "MINIMUM" as "MINIMUM" was the classification result for 8 time instances, as compared to 3 time instances for "MAXIMUM".

FIG. 4 shows a table 400 that contains the intermediate and final results of the method 100, when applied on the input image 200 of FIG. 2. The method 100 may produce a more accurate recognition result as compared to the result shown in FIG. 3, by track accumulating the classification result of each element. In this example, the input data may include the input image 200. The input image 200 may include an observation of a traffic sign that reads "MAXIMUM SPEED 5 MPH". Thus, the traffic sign "MAXIMUM SPEED 5 MPH" may be referred to as the object 430. Each alphanumeric character of the traffic sign may be referred to as an element 432. In other words, the object 430 may include a plurality of elements 432. Column 402 of the table 400 indicates a time instance between, and including, t–10 to t. Each row shows the classification result of the plurality of elements 432, at the respective time instance. Block 412 shows the classification results of characters, also referred herein as classifications 434 of the elements, in the first line 202, as obtained in 110 of FIG. 1. Block 414 shows the classification results of characters in the second line 204, as obtained in 112 of FIG. 1. Block 416 shows the classification results of characters in the third line 206, as obtained in 118 of FIG. 1. The highlighted cells with black background and white text indicate classification results with higher confidence. The block 404 shows the output of a language processor or word corrector that checks the intermediate results of individual rows against predefined combinations of characters, like in 114 and/or 122 of FIG. 1. Block 412 also shows the accumulated classifications 436 for each element 432 in the first line 202. The recognition results for each element in the input data, also referred herein as element recognitions 438, may be obtained from the process 120 of FIG. 1. The element recognition 438 for each element 432 may be determined based on the classification 434 that occurred the most across the time instances t–10 to t. The process 120 may include counting the occurrences for each classification 434. In this example, the first character of the first line is classified as "N" thrice, and classified as "M" eight times. The character "M" may be determined as the element recognition 438, as the occurrence count for "M" is higher than the occurrence count for "N". This process is performed for each element 432 of each line, to obtain the object recognition 406 of "MAXIMUM SPEED 7 MPH". The object recognition 406 may include an aggregate of the element recognitions 438, also referred herein as element aggregate.

Alternatively, the accumulation process may take into consideration other factors, such as confidence level of each classification. For example, the white cells may indicate a confidence level of <0.75, while the dark cells may indicate a confidence level of >0.75. A weighted score for each classification type, for example "N" or "M." may be computed based on the confidence level of each classification occurrence. Still using the first element 432 of the first line as an example, the occurrence count for classification type "N" may be multiplied by an average, or a sum, or a mean value, of the confidence level of the "N" classification types, to obtain the weighted score for "N" classification type. The weighted score for classification type "M" may be similarly computed. The weighted scores for classification types "N" and "M" may be compared, and the element recognition 438 for the element may be determined based on the higher weighted score.

Optionally, the object recognition 406 of "MAXIMUM SPEED 7 MPH" may be input into the language processor, like in 122 of FIG. 1. The language processor may compare the object recognition 406 against known combinations of the elements and known arrangements of element strings. For example, the language processor may determine that the combination of "7" with "MPH", or the combination of "MAXIMUM" and "7 MPH", are absent in the known combinations or arrangements. As such, the language processor may search for the closest matching combination, to correct the object recognition 406 of "MAXIMUM SPEED 7 MPH" to "MAXIMUM SPEED 5 MPH" as shown in block 424. The method 100 may resolve the inaccuracies in the final result of FIG. 3.

FIG. 5 shows an extension to the table 400, in relation to fusing the classification output of 130, with the element-level classification results shown in FIG. 4. A classifier may be run directly on the entire input image or an entire line, in parallel to classifying individual elements, for example, if the input image is assessed to be of insufficient quality to be analyzed at element-level. The word-level classifier results are shown in block 502. Block 504 shows a tabulation of the occurrences count for word-level classification, taking into consideration both the results in block 502 and those from blocks 412, 414 and 416 of FIG. 4. An accumulated fusion result 506 is generated, by selecting the word-level classification with the highest occurrence count for each word. The accumulated fusion result 506 may be combined with the corrected object recognition in block 424, as a weighted sum. The weight may be computed in different ways, for example, the weights may be equally distributed, or may be predefined values or may be dynamically computed values. An example for dynamically computed weight, may be computed based on the size of the element, or the classification type of the element. For example, in a traffic sign, a large character may be given more weight as the large character may be of higher image resolution such that the classification accuracy is higher. Also, in a traffic sign, numeric characters may be given higher weightage than alphabetical characters as they are easier to recognize.

FIG. 6 shows a flow diagram of a method 600 for recognition of elements, according to various embodiments. The method 600 may be a computer-implemented method. The method 600 may include processes 602, 604, 606, 608, and 610. The process 602 may include receiving input data. The input data may include an observation of an object that includes a plurality of elements. The input data may be, for example, an input image 200. The process 604 may include classifying each element of the plurality of elements more than once, based on the observation of the object. An example of the element may be 432 of FIG. 4. The process 604 may result in a plurality of classifications for each element. The classification for an element may be, for example, 434 of FIG. 4. The process 606 may include accumulating the plurality of classifications for each element, resulting in accumulated classifications for each element. The accumulated classifications of an element may be, for example, 436 of FIG. 4. The process 608 may include recognizing each element based on the respective accumulated classifications, resulting in a plurality of element recognitions. An element recognition may be, for example,

438 of FIG. 4. The process 610 may include recognizing the object based on the plurality of element recognitions, for example, like 406 of FIG. 4.

The method 600, by accumulating classifications at the element-level, may improve the overall recognition accuracy, while minimizing the computational resources required from the classifier which only needs to recognize individual elements. The method 600 may reduce incorrect recognitions, and may improve stability of the recognition results as the number of accumulation cycles increase.

According to an embodiment which may be combined with the above-described embodiment or with any below described further embodiment, the input data may include observations of more than one object. For example, an input image may include a traffic sign and street sign. The method 600 may be applied to each object in the input data.

According to an embodiment which may be combined with any above-described embodiment or with any below described further embodiment, the input data may include a plurality of datasets. Each dataset of the plurality of datasets may include a respective observation of the object. Classifying each element of the plurality of elements more than once may include classifying each element based on the respective observation of the object from each dataset of the plurality of datasets. In other words, the input data may include observations of the same object, that were obtained independently, for example, obtained at different times, or obtained from different sensors. As the plurality of datasets contain duplicate information about the same object, the accumulating the classifications of the elements may result in retaining accurate information while discarding erroneous information, thereby improving recognition of the object. Optionally, the plurality of datasets may be a sequence of datasets.

The input data may optionally include a video, and each dataset of the plurality of datasets may include an image frame of the video. The method 600 may thus be used to recognize an object captured in the video.

According to an embodiment which may be combined with any above-described embodiment or with any below described further embodiment, each dataset of the plurality of datasets may be obtained independently. In other words, each dataset may be obtained from different source from the other datasets, or that each dataset may be generated without involvement of the other datasets. For example, the method 600 may be used to improve recognition of an object that is captured by different types of sensors, or by sensors arranged at different positions. This may overcome temporal errors that occur in one data source.

According to an embodiment which may be combined with any above-described embodiment or with any below described further embodiment, classifying each element of the plurality of elements more than once may include classifying each element using a plurality of classifiers to determine a respective classification of the element by each classifier of the plurality of classifiers. Optionally, at least one classifier of the plurality of classifiers may include a machine learning model, for example, a convolutional neural network (CNN). The machine learning model may include a regression-based neural network or a classification-based neural network. The regression-based neural network may be suitable to classify elements that include continuous data. The classification-based neural network may be suitable to classify elements that include discrete data. The machine learning model may include, for example, support vector machine (SVM), multi-layer perceptron (MLP) or CNN. The machine learning model is further described elsewhere herein.

According to an embodiment which may be combined with any above-described embodiment or with any below described further embodiment, recognizing each element based on the respective accumulated classifications may include sorting the accumulated classifications into a plurality of classification types, counting number of classifications in each classification type of the plurality of classification types, resulting in a count for each classification type. Recognizing each element based on the respective accumulated classifications may further include recognizing the element based on the classification type with a highest count. By doing so, the method 600 may discard the less probable classification results.

According to an embodiment which may be combined with any above-described embodiment or with any below described further embodiment, recognizing each element based on the respective accumulated classifications may include sorting the accumulated classifications into a plurality of classification types, counting number of classifications in each classification type of the plurality of classification types, resulting in a count for each classification type. Recognizing each element based on the respective accumulated classifications may further include, for each classification type of the plurality of classification types, computing a weighted score based on at least one of the count, confidence level, distance between the classifications, element size and track length. Track length may refer to the length or size of the accumulation, in other words, the data size within the accumulation. Element size may be applicable to images, where the larger the element size, the better the resolution and accuracy of classification and as such, the classification may be given a larger weight. Distance between the classifications may be defined as the distance in values of the classifications, and may be applicable to classifications that are based on continuous data. For example, if the classifications are different vehicle speeds, such as 50 km/h, 60 km/h etc., the distance between the classifications may be 10 km/h.

Recognizing each element based on the respective accumulated classifications may further include recognizing the element based on the classification type with a highest weighted score. By doing so, the method 600 may evaluate the probability of each classification type being the correct classification, and thereby select the most likely classification type. The method 600 may reduce incorrect recognitions, and may improve stability of the recognition results as the number of accumulation cycles increase.

According to an embodiment which may be combined with any above-described embodiment or with any below described further embodiment, recognizing the object may include aggregating more than one element recognition to form an element aggregate, and comparing the element aggregate to a plurality of predefined combinations of elements. By doing so, the method 600 may enhance accuracy of the object recognition, as the predefined combinations may serve as a filter to eliminate erroneous recognitions. Recognizing the object may optionally further include finding a closest match between the element aggregate and the plurality of predefined combinations of elements. By doing so, the method 600 may correct the erroneous element classifications, and obtain an object recognition even when there is no exact match in the predefined combinations of elements According to an embodiment which may be combined with any above-described embodiment or with any below described further embodiment, the method 600 may further include recording the input dataset using a sensor. The sensor may be, for example, a camera.

According to an embodiment which may be combined with any above-described embodiment or with any below described further embodiment, the method may further include extracting the plurality of elements from the input data. Extracting the plurality of elements may include segmenting each dataset into a plurality of subsets, wherein each subset of the plurality of subsets comprises no more than a single element. The classifier accuracy may improve as the classifier is prevented from mistaking multiple small-sized elements as a single element.

According to an embodiment, the method for recognition of elements may be used for reading vehicle measurements or dynamics. In 602, the input data received may include an observation of an object. In this embodiment, the object may refer to a motion parameter of the vehicle, while the observation of the object may refer to sensor readings relating to the motion parameter, such as odometry data. The observation, i.e. the sensor readings, may include a plurality of elements. The plurality of elements may include, for example, wheel speed and steering angle. In 604, classifying each element of the plurality of elements more than once, may include classifying the wheel speed over multiple time cycles, and classifying the steering angle over multiple time cycles. In this embodiment, classification of the element may refer to determining the value of the element based on the sensor readings. For example, classifying the wheel speed may refer to determining the wheel speed value of a time cycle, based on the wheel speed measurement. In 606, accumulating the plurality of classifications for each element may include accumulating the determined wheel speeds over the multiple time cycles, and accumulating the determined steering angles over the multiple time cycles. In 608, recognizing each element based on the respective accumulated classifications, may include determining a most often occurring value of the wheel speed and steering angle over the multiple time cycles. In an example, the multiple time cycles may refer to a very short duration, such as three processor cycles. In 610, recognizing the object may include recognizing the motion parameter, which may be vehicle speed or vehicle trajectory. In this embodiment, recognizing the object may refer to determining the value of the object, i.e. the motion parameter.

According to an embodiment, the method for recognition of elements may be used for reducing noise in signal processing applications. For example, the input data may include raw signal data received from a receiver. Noise in the raw signal data may be filtered out by accumulating the information recognized from the raw signal data. In 602, the input data received may include an observation of an object. In this embodiment, the object may refer to a signal such as an audio sound or an electrical signal, while the observation of the object may refer to recorded data of the signal. The observation, i.e. the recorded data, may include a plurality of elements. The plurality of elements may include, for example, frequency and amplitude. In 604, classifying each element of the plurality of elements more than once, may include classifying the frequency over multiple time cycles, and classifying the amplitude over multiple time cycles. In this embodiment, classification of the element may refer to determining the value of the element based on the recorded data. For example, classifying the frequency may refer to determining the frequency value. In 606, accumulating the plurality of classifications for each element may include accumulating the determined frequencies over the multiple time cycles, and accumulating the determined amplitudes over the multiple time cycles. In 608, recognizing each element based on the respective accumulated classifications, may include determining a most often occurring value of the frequency and amplitude over the multiple time cycles. In an example, the multiple time cycles may refer to a very short duration, such as three processor cycles. In 610, recognizing the object may include recognizing the signal. In this embodiment, recognizing the object may refer to determining the characteristics of the signal.

According to various embodiments, the method 600 may include the method 100 described with respect to FIG. 1. For example, the process 602 may include 102. The process 604 may include 118. The process 606 may include 120. The process 608 and 610 may also be part of 120. The process 610 may further include 122 and 124.

FIG. 7 shows a conceptual diagram of an element recognition device 700 according to various embodiments. The element recognition device 700 may include a processor 702. The processor 702 may be configured to perform the method 600. The element recognition device 700 may optionally further include a sensor 706. The sensor 706 may be configured to record the input dataset. The element recognition device 700 may optionally include a mobility mechanism 704. The mobility mechanism 704 may be configured to move the element recognition device 700. The mobility mechanism 704 may optionally be further configured to adapt movement of the element recognition device 700 based on the recognition of the object in the input data.

According to various embodiments, the element recognition device 700 may be a vehicle. The mobility mechanism 704 may include an engine and a set of wheels. The engine may drive the set of wheels, to move the vehicle. According to various embodiments, the method 600 may be carried out by a computer. The computer may be part of a vehicle. The vehicle may use the method 600 to recognize traffic signs, traffic participants, etc.

Within the present disclosure, each element may be an alphanumeric character or a pictogram.

Within the present disclosure, the object may include a string of elements. For example, the elements may be arranged in a specific order, such as sequential order, or spatial order.

According to various embodiments, at least one classifier of the plurality of classifiers may include a machine learning model. The machine learning model may include, for example, at least one of SVM, MLP or CNN, as described below.

A support vector machine (SVM) is a supervised machine learning model that is configured to classify input data into two separate classes. The SVM may map labelled training data to points in space so as to determine a decision boundary based on maximizing the width of the decision boundary from the two classes. The SVM may then classify new input data based on which side of the decision boundary it falls under. The SVM generally has higher speed and better performance as compared to neural networks, when the input data is small, for example in the thousands. This makes the algorithm very suitable for text classification problems, where it is common to have access to a dataset of at most a couple of thousands of tagged samples. As an example, for classifying an alphanumeric symbol, a training dataset may be provided to the SVM. The training dataset may include a set of images that include the symbol "A" and are tagged as class "A," and another set of images that include the symbol "B" and tagged as class "B." After the training process, when given new images, the SVM may be configured to classify them as class "A" or "B." Example of a suitable kernel function for the SVM may be the Radial Basis Function Kernel (RBF), where the similarity between two points in the transformed feature space is an exponentially decaying function of the distance between the vectors and the original input space The RBF kernel may be expressed as:

$$K(\boldsymbol{x}, \boldsymbol{x}')=\exp(-\gamma\| \boldsymbol{x} - \boldsymbol{x}'\|),$$

where $\gamma$ is a parameter that sets the "spread" of the kernel. The RBF is of the form of a bell-shaped curve and they parameter sets the width of the bell-shaped curve.

A multilayer perceptron (MLP) is a fully connected class of feedforward artificial neural network. The MLP may include three types of layers—the input layer, output layer and the hidden layer. The input layer may be configured to receive the input signal to be processed. The required task such as prediction and classification may be performed by the output layer. An arbitrary number of hidden layers may be placed in between the input and output layer. In the MLP, data flows in the forward direction from the input layer to the output layer. The neurons in the MLP may be trained with the back propagation learning algorithm. The MLP may be trained with a training dataset that includes input-output pairs. The MLP may learn to model the correlation (or dependencies) between those inputs and outputs. The training may involve adjusting the parameters, or the weights and biases, of the model in order to minimize error. Backpropagation may be used to make the weigh and bias adjustments relative to the error. The MLP may be capable of approximating any continuous function. The MLP may be able to solve problems that are not linearly separable. As an example, the MLP may be used to filter noise from an audio signal. For the training process, the MLP may be provided with a training dataset that includes an audio signal mixed with noise (input), and the clean audio signal (desired output). The MLP may propagate the input data to the hidden layer and to the output layer. Based on the output, the MLP may calculate the error between the predicted clean audio signal and the actual clean audio signal, backpropagate the error and update the weights in the hidden layers. This may be repeated multiple times until the error is minimized. The input data set may be any data that includes a set of audio files with background noise, and the output of the MLP may be a set of audio files without the background noise. The loss function of the MLP may be for example, mean squared error, or mean squared logarithmic error loss, or mean absolute error loss.

A CNN is a multi-layered feed-forward neural network, made by stacking many hidden layers on top of each other in sequence. The sequential design may allow convolutional neural networks to learn hierarchical features. The hidden layers are typically convolutional layers followed by activation layers, some of them followed by pooling layers. The CNN may be configured to identify pattens in data. The convolutional layer may include convolutional kernels, that are used to look for patterns across the input data. The convolutional kernel may return a large positive value for a portion of the input data that matches the kernel's pattern or may return a smaller value for another portion of the input data that does not match the kernel's pattern. The CNN may be able to extract informative features from the training data without the need for manual processing of the training data. The CNN may produce accurate results where large unstructured data is involved, such as image classification, speech recognition and natural language processing. Also, CNN is computationally efficient, as it is able to assemble patterns of increasing complexity using the relatively small kernels in each hidden layer. As an example, the CNN may be used to classify objects in an image. The training process may include providing the CNN with training dataset that includes images with alphanumeric symbols and labelled as "symbols." and images with traffic pictorial signs and labelled as "pictures." The CNN may find a pattern in the alphanumeric symbol training images, and another pattern in the pictorial sign training images. The trained CNN may then be able to receive new images and classify them as containing pictures or symbols based on the identified patterns. The input data to the CNN may be for example, images, and the output of the CNN may be classifications of the images. The loss function of the CNN may be for example, cross-entropy loss.

In an example, the CNN may be setup having seven layers (C1, S2, C3, S4, C5, F6, and L7) as described below:

C1: The first convolutional layer. This consists of six convolutional kernels of size 5×5, which 'walk over' the input image. C1 outputs six images of size 28×28. The first layer of a convolutional neural network normally identifies basic features such as straight edges and corners.

S2: A subsampling layer, also known as an average pooling layer. Each square of four pixels in the C1 output is averaged to a single pixel. S2 scales down the six 28×28 images by a factor of 2, producing six output images of size 14×14.

C3: The second convolutional layer. This consists of 16 convolutional kernels, each of size 5×5, which take the six 14×14 images and walk over them again, producing 16 images of size 10×10.

S4: The second average pooling layer. S4 scales down the sixteen 10×10 images to sixteen 5×5 images.

C5: A fully connected convolutional layer with 120 outputs. Each of the 120 output nodes is connected to all of the 400 nodes (5×5×16) that came from S4. At this point the output is no longer an image, but a 1D array of length 120.

F6: A fully connected layer mapping the 120-array to a new array of length 10. Each element of the array now corresponds to a handwritten digit 0-9.

Output Layer: A softmax function which transforms the output of F6 into a probability distribution of 10 values which sum to 1.

While embodiments of the invention have been particularly shown and described with reference to specific embodiments, it should be understood by those skilled in the art that various changes in form and detail may be made therein without departing from the spirit and scope of the invention as defined by the appended claims.

The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

The invention claimed is:

1. A computer-implemented method for recognition of elements, the method comprising:

receiving input data comprising an observation of an object, the object comprising a plurality of elements;

classifying each element of the plurality of elements more than once based on the observation of the object, resulting in a plurality of classifications for each element;

accumulating the plurality of classifications for each element, resulting in accumulated classifications for each element;

recognizing each element based on the respective accumulated classifications, resulting in a plurality of element recognitions; and recognizing the object based on the plurality of element recognitions;

wherein classifying each element of the plurality of elements more than once comprises classifying each element using a plurality of classifiers to determine a respective classification of the element by each classifier of the plurality of classifiers;

wherein at least one classifier of the plurality of classifiers comprises a machine learning model;

wherein the machine learning model comprises at least one of support vector machine, multi-layer perceptron and convolutional neural network.

2. The computer-implemented method of claim 1, wherein the input data comprises a plurality of datasets, wherein each dataset of the plurality of datasets comprises a respective observation of the object, and wherein classifying each element of the plurality of elements more than once comprises classifying each element based on the respective observation of the object from each dataset of the plurality of datasets.

3. The computer-implemented method of claim 2, wherein the input data comprises a video, and wherein each dataset of the plurality of datasets comprises an image frame of the video.

4. The computer-implemented method of claim 2, wherein each dataset of the plurality of datasets is obtained independently.

5. The computer-implemented method of claim 1, further comprising:

recording the input data using a sensor, wherein the sensor comprises a camera.

6. A computer-implemented method, the method comprising:

receiving input data comprising an observation of an object, the object comprising a plurality of elements;

classifying each element of the plurality of elements more than once based on the observation of the object, resulting in a plurality of classifications for each element;

accumulating the plurality of classifications for each element, resulting in accumulated classifications for each element;

recognizing each element based on the respective accumulated classifications, resulting in a plurality of element recognitions; and recognizing the object based on the plurality of element recognitions, wherein recognizing each element based on the respective accumulated classifications comprises sorting the accumulated classifications into a plurality of classification types, counting a number of classifications in each classification type of the plurality of classification types, resulting in a count for each classification type, and recognizing the element based on the classification type with a highest count.

7. A computer-implemented method, the method comprising:

receiving input data comprising an observation of an object, the object comprising a plurality of elements;

classifying each element of the plurality of elements more than once based on the observation of the object, resulting in a plurality of classifications for each element;

accumulating the plurality of classifications for each element, resulting in accumulated classifications for each element;

recognizing each element based on the respective accumulated classifications, resulting in a plurality of element recognitions; and recognizing the object based on the plurality of element recognitions;

wherein recognizing each element based on the respective accumulated classifications comprises sorting the accumulated classifications into a plurality of classification types, counting a number of classifications in each classification type of the plurality of classification types, resulting in a count for each classification type, and for each classification type of the plurality of classification types, computing a weighted score based on at least one of the count, confidence level, distance between the classifications, element size or track length, and recognizing the element based on the classification type with a highest weighted score.

8. A non-transitory computer-readable medium comprising instructions which, when executed by a computer, cause the computer to carry out at least one of the computer-implemented methods of claim 6 or 7.

9. A computer-implemented method, the method comprising:

receiving input data comprising an observation of an object, the object comprising a plurality of elements;

classifying each element of the plurality of elements more than once based on the observation of the object, resulting in a plurality of classifications for each element;

accumulating the plurality of classifications for each element, resulting in accumulated classifications for each element;

recognizing each element based on the respective accumulated classifications, resulting in a plurality of element recognitions; and recognizing the object based on the plurality of element recognitions;

wherein recognizing the object comprises aggregating more than one element recognition to form an element aggregate, and comparing the element aggregate to a plurality of predefined combinations of elements.

10. The computer-implemented method of claim 9, wherein recognizing the object further comprises finding a closest match between the element aggregate and the plurality of predefined combinations of elements.

11. An element recognition device comprising a processor configured to perform the computer-implemented method of claim 1, the element recognition device further comprising:

a mobility mechanism configured to move the element recognition device, also configured to adapt movement of the element recognition device based on the recognition of the object in the input data; and a sensor configured to record the input data, wherein the sensor comprises a camera.

\* \* \* \* \*